United States Patent
Miyahara

(10) Patent No.: US 7,027,093 B2
(45) Date of Patent: Apr. 11, 2006

(54) METHOD OF TRANSFERRING ELECTRIC CHARGE FROM IMAGE SENSING DEVICE AND IMAGE SENSING DEVICE

(75) Inventor: Hiroyuki Miyahara, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 693 days.

(21) Appl. No.: 10/210,092

(22) Filed: Aug. 2, 2002

(65) Prior Publication Data

US 2003/0025820 A1 Feb. 6, 2003

(30) Foreign Application Priority Data

Aug. 2, 2001 (JP) ............... 2001-234614

(51) Int. Cl.
*H04N 5/335* (2006.01)

(52) U.S. Cl. ...................... 348/313; 348/324

(58) Field of Classification Search ........... 348/311, 348/316, 324, 323, 315, 313
See application file for complete search history.

(56) References Cited

U.S. PATENT DOCUMENTS

| | | | | |
|---|---|---|---|---|
| 4,620,231 A | * | 10/1986 | Kosonocky | 348/164 |
| 4,638,371 A | * | 1/1987 | Milch | 358/474 |
| 4,647,977 A | * | 3/1987 | Tower | 348/321 |
| 5,467,128 A | * | 11/1995 | Yates et al. | 348/187 |
| 5,608,242 A | * | 3/1997 | Kamasz et al. | 257/216 |
| 6,373,522 B1 | * | 4/2002 | Mathews et al. | 348/144 |
| 6,392,260 B1 | * | 5/2002 | Farrier et al. | 257/215 |
| 6,822,682 B1 | * | 11/2004 | Kawajiri et al. | 348/315 |
| 6,914,633 B1 | * | 7/2005 | Yamada | 348/315 |

* cited by examiner

Primary Examiner—Ngoc-Yen Vu
Assistant Examiner—Nicholas G Giles
(74) Attorney, Agent, or Firm—Connolly Bove Lodge & Hutz LLP

(57) ABSTRACT

An image sensing device for transferring electric charge from a plurality of photoelectric converters disposed therein. The image sensing device is divided into a plurality of pixel areas. At least a pair of the divided pixel areas contiguous to each other have a vertical transfer CCD, an oblique shift CCD and a horizontal transfer CCD to transfer the electric charge from the photoelectric converters to an output stage. The output stage is at least disposed contiguous to the boundary of the divided pixel areas adjacent to each other.

3 Claims, 4 Drawing Sheets

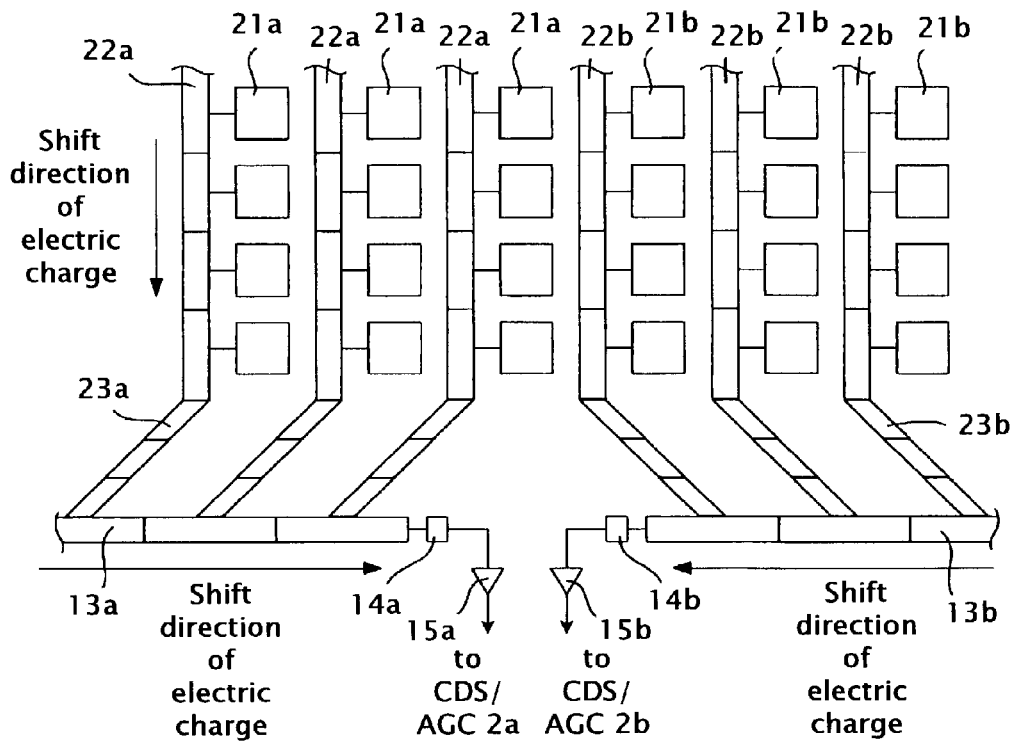
Fig. 3
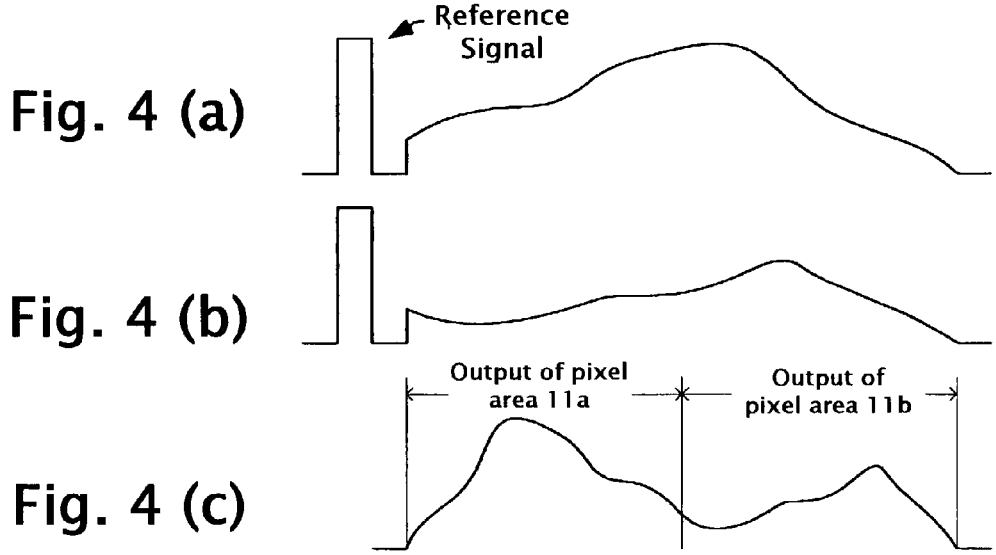
Fig. 4 (a)
Fig. 4 (b)
Fig. 4 (c)

METHOD OF TRANSFERRING ELECTRIC CHARGE FROM IMAGE SENSING DEVICE AND IMAGE SENSING DEVICE

BACKGROUND OF THE INVENTION

1. Field of the Invention

The present invention relates to a method for transferring an electric charge from an image sensing device and an image sensing device preferable for use in a video camera enabling to take pictures of moving images and still images.

2. Description of the Related Art

A solid-sate image sensing device outputs an electric signal converted from an incoming light image and is utilized for a video camera and a digital still camera. As for the solid-state image sensing device, a high resolution image can be obtained by increasing a number of pixels of the image sensing device. Recently, video camera users want to obtain not only moving images but also a high resolution still image taken by a video camera. Accordingly, the image sensing device for video camera is in need of having more pixels.

FIG. 6 is a plan view of a conventional solid-state image sensing device. In FIG. 6, the image sensing device is composed of a photoelectric converter 31 for converting light images into an electric signal, a vertical transfer CCD (hereinafter referred to as "VCCD") 32 for transferring an electric charge to vertical shift register, a horizontal transfer CCD (hereinafter referred to as "HCCD") 33 for transferring an electric charge to horizontal shift register, an amplifier 34 for amplifying the electric charge from the HCCD 33.

A timing generator not shown generates a read-out pulse for each VD (vertical sync signal) period of a television signal. The electric charge stored in each photoelectric converter 31 is transferred to the adjacent VCCD 32 each time when generating the read-out pulse.

The VCCD 32 shifts the electric charge from each photoelectric converter 31 to the succeeding stage of the VCCD 32 one by one toward the HCCD 33. The HCCD 33 outputs all electric charges transferred from the VCCD 32 through the amplifier 34. Accordingly, the velocity of shifting the electric charge in HCCD 33 should be adjusted to the speed which can output all the electric charges transferred from the VCCD 32 through the amplifier 34 at each time when electric charges equivalent to one stage of the VCCD 32 are transferred from the VCCD 32.

As described above, the electric charge stored in each photoelectric converter 31 is temporally transferred to VCCD 32. The electric charges transferred from VCCD 32 to HCCD 33 are shifted to horizontal direction and outputted through the amplifier 34.

When the number of pixels in the vertical direction and the horizontal direction of photoelectric converter 31 increases, the number of stages for shifting electric charge in the VCCD 32 and the HCCD 33 also increases. Accordingly, a clock frequency for transferring electric charge should be increased as the number of pixels of the photoelectric converter 31 increases.

However, the increase of clock frequency may cause problems such as generating heat, increasing electric power consumption, and deteriorating signal to noise ratio. FIG. 7 shows an example of solid-state image sensing device of which clock frequency for transferring electric charge of HCCD is lowered.

In FIG. 7, the solid-state image sensing device is composed of a pixel area 41 for disposing a photoelectric converter in vertical and horizontal directions and constituting VCCD, HCCDs 42 and 43 for shifting electric charge transferred from VCCD in the pixel area 41, adders 44 and 45 for adding a reference signal of predetermined level to the electric charge to be outputted from HCCDs 42 and 43 respectively, amplifiers 46 and 47 for amplifying the reference signal and the electric charge supplied from the adders 44 and 45 respectively. The reference signal is utilized for compensating scatter of each channel characteristic before synthesizing electric charge of each channel.

The electric charge transferred from the VCCD in the pixel area 41 is dispersed into the HCCD 42 and the HCCD 43, and is shifted to the vertical direction by each of the HCCDs 42 and 43. Accordingly, the clock frequency necessary for shifting the electric charge in each of the HCCD 42 and 43 can be reduced to a half of the clock frequency for single HCCD.

In case of the solid-state image sensing device shown in FIG. 7, the pixel size generally becomes smaller when a number of pixels increases. If the pixel size becomes smaller, the transferring efficiency for electric charge becomes insufficient and resulted in that the quality of image may be affected.

Recently, the whole system of video camera including the optical system is miniaturized and the solid-state image sensing device is also miniaturized into ⅓ inch or ¼ inch size. However, when many photoelectric converters are disposed in a miniaturized image sensing device, the transferring efficiency becomes insufficient for VCCD to shift its electric charges to HCCD in the pixel area 41 and resulted in that the quality of image may be affected.

SUMMARY OF THE INVENTION

In order to solve the problem of the related art, the present invention provides an image sensing device for obtaining high quality of image by suppressing clock frequency for transferring electric charge even for the image sensing device having more than one million pixels.

Accordingly, in consideration of the above-mentioned problems of the related art, an object of the present invention is to provide a method of transferring electric charge from an image sensing device converting light image into an electric signal by a plurality of photoelectric converters disposed in a CCD, the method including the steps of: dividing a plurality of pixel areas of the CCD; transferring an electric charge from the plurality of photoelectric converters in each divided pixel area of the CCD; and outputting an electric signal from an output stage of each divided pixel area of the CCD, wherein the divided pixel areas adjacent to each other have at least one set of output stages contiguous to the boundary of the divided pixel areas in the CCD.

The other object of the present invention is to provide an image sensing device for transferring electric charge to convert light image into an electric signal by a plurality of photoelectric converters disposed in a CCD, the image sensing device including: a plurality of pixel areas divided in the CCD for transferring an electric charge from the photoelectric converters; a VCCD for transferring the electric charge from the plurality of photoelectric converters in the vertical direction; an oblique shift CCD for transferring the electric charge from each pixel area to shift the electric charge in oblique direction; a HCCD for transferring the electric charge from the oblique shift CCD in the horizontal direction to output an electric signal; and an output stage for outputting the electric signal from the electric charge transferred from the HCCD in each divided pixel area, wherein the output stage is at least disposed contiguous to the boundary of the pixel areas adjacent to each other in the CCD.

Other object and further features of the present invention will be apparent from the following detailed description when read in conjunction with the accompanying drawings.

BRIEF DESCRIPTION OF DRAWINGS

FIG. 3 is a diagram for explaining an output of electric charge from HCCD shown in FIG. 2.

FIGS. 4(a) to 4(c) are examples of a CCD signal and a reference signal in accordance with the present invention.

DETAILED DESCRIPTION OF THE PREFERRED EMBODIMENTS

Figure 1:
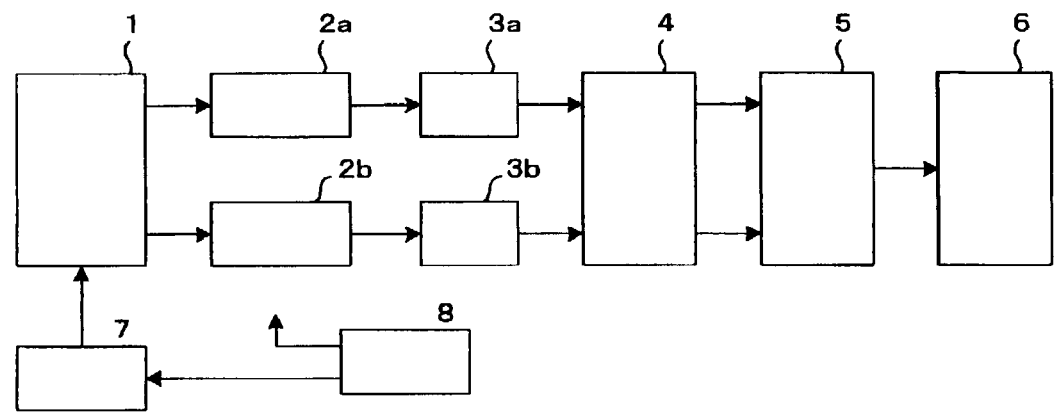
FIG. 1 is a block diagram of an image sensing apparatus installed with an image sensing device according to an embodiment of the present invention.

FIG. 1 is a block diagram of an image sensing apparatus installed with an image sensing device according to an embodiment of the present invention. In FIG. 1, an image sensing device in accordance with the present invention is composed of a solid-state image sensing device 1 for converting light images into an electric signal (hereinafter referred to as "CCD signal"), CDS/AGCs 2a and 2b for eliminating noise component and adjusting the signal level for a CCD signal of each separate channel, analog to digital (A/D) converters 3a and 3b for converting the CCD signal in analog form into digital, a comparison circuit 4 for adjusting the level of digital CCD signal by comparing each CCD signal in each channel with each other, a line converter 5 for generating a CCD signal in one direction, a Y/C processor 6 for carrying out signal processing such as gamma correction and aperture control on the CCD signal outputted from the line converter 5, a timing generator 7 for supplying a driving pulse to the solid-state image sensing device 1, and controller 8 for controlling each portion of the image sensing device.

Figure 2:
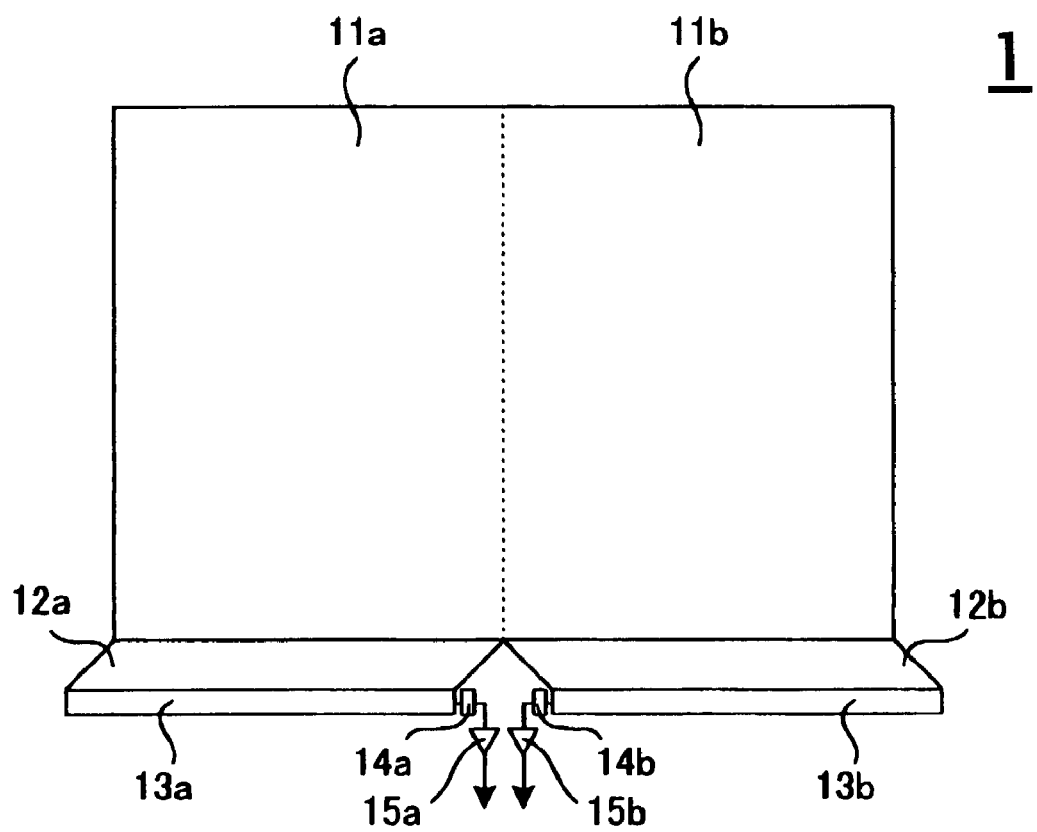
FIG. 2 is an enlarged plan view of the solid-state image sensing device shown in FIG. 1.

FIG. 2 is an enlarged plan view of the solid-state image sensing device shown in FIG. 1. In FIG. 2, the solid-state image sensing device 1 is composed of a first pixel area 11a and a second pixel area 11b arranged with a plurality of photoelectric converters in horizontal and vertical matrix array, respectively, and provided with VCCD, a first oblique area 12a and a second oblique area 12b for shifting an electric charge transferred from the VCCD in the first pixel area 11a and the second pixel area 11b, areas 13a and 13b are HCCDs for transferring an electric charge from the first and second oblique areas 12a and 12b to the horizontal direction, electric charge injectors 14a and 14b for injecting a reference signal of predetermined level to the electric charge from the HCCDs 13a and 13b, and amplifiers 15a and 15b for amplifying and outputting the reference signal and electric charge.

In FIG. 2, the electric charge injectors 14a and 14b are indicated as a separate element. However, the difference of signal level of the reference signal to be supplied to each channel can be minimized by following structure. One reference signal generator provides the reference signal to first and second adder wherein the first adder is provided between the HCCD 13a and the amplifier 15a, and the second adder is provided between the HCCD 13b and amplifier 15b. In this case, the reference signal generator is provided in the same distance from the first adder and the second adder respectively, so that the level difference of the reference signal to be provided to each channel can be minimized.

FIG. 3 is an enlarged view of an output portion of the HCCD shown in FIG. 2. In FIG. 3, the output portion of the HCCD is composed of photoelectric converters 21a and 21b to convert light into an electric signal, VCCDs 22a and 22b for transferring electric charges from each of photoelectric converters 21a and 21b to vertical direction, oblique shift CCDs 23a and 23b for shifting electric charge transferred from the VCCDs 22a and 22b and shifted to each HCCD 13a and 13b. The photoelectric converter 21a and the VCCD 22a is provided in the pixel area 11a, and the photoelectric converter 21b and the VCCD 22b is provided in the pixel area 11b shown in FIG. 2. The oblique shift CCDs 23a and 23b are provided in the shift areas 12a and 12b shown in FIG. 2 respectively.

The image sensing device may be a solid-state image sensing device of progressive-scan type, which can output one frame of signal during one VD period, or interline type, which can output one field of signal during one sync period. The one sync period as specified hereto indicates one field period or one horizontal scanning period of the NTSC system television signal.

The image sensing device in accordance with the present invention is capable of taking still pictures and moving pictures. Below is the operation of taking moving pictures by the image sensing device.

The timing generator 7 shown in FIG. 1 outputs a driving pulse to the solid-state image sensing device 1. The driving pulse includes a read-out pulse of the electric charges from the photoelectric converters 21a and 21b, a vertical transferring pulse of the VCCDs 22a and 22b, and a horizontal transferring pulse of the HCCD 13a and 13b.

When the read-out pulse is provided to the solid-state image sensing device 1 by the timing generator 7, the electric charges stored in all areas of the photoelectric converters 21a and 21b are transferred to contiguous VCCDs 22a and 22b respectively. Then the electric charges stored are shifted to the HCCD 13a and 13b by the timing of the vertical transferring pulse from the timing generator 7.

The electric charges to be outputted from the VCCD 22a in the pixel area 11a shown in FIG. 2 are transferred to the input of the oblique shift CCD 23a in the first oblique area 12a. The electric charges to be outputted from VCCD 22b in the pixel area 11b shown in FIG. 2 are transferred to the input of the oblique shift CCD 23b in the second oblique area 12b.

The oblique shift CCDs 23a and 23b are also provided with vertical transferring pulse identical to the HCCDs 22a and 22b. The electric charge transferred into the oblique shift CCDs 23a and 23b is shifted to oblique direction in the timing of vertical transferring pulse. Then the output from the oblique shift CCDs 23a and 23b are transferred to the HCCDs 13a and 13b respectively.

The electric charge from the photoelectric converter 21a in the pixel area 11a is transferred through the VCCD 22a and the oblique shift CCD 23a. The electric charge from the photoelectric converter 21b in the pixel area 11b is transferred through the VCCD 22b and the oblique shift CCD 23b.

The HCCDs 13a and 13b are provided with horizontal transferring pulse of different phase respectively. The electric charge in the HCCD 13a is shifted to right side and the electric charge in the HCCD 13b is shifted to left side by the transferring pulse. The electric charge injectors 14a and 14b provide a reference signal of predetermined level at the top of the electric charge for one scanning line so that the signal outputs from the amplifiers 15a and 15b become as shown in FIGS. 4(a) to 4(c). The signal level for the reference signal to be inputted in the electric charge injectors 14a and 14b are supposed to have the same level.

FIGS. 4(a) to 4(c) are examples of a CCD signal and a reference signal in accordance with the present invention. FIG. 4(a) shows a waveform of signal output from the amplifier 15a, and FIG. 4(b) shows a waveform of signal output from the amplifier 15b. The head portion of each waveform indicated in FIGS. 4(a) and 4(b) is the reference signal supplied to the top of the CCD signal for one scanning line. The electric charge in the pixel area 11b is outputted sequentially from a pixel in the left side to a pixel in the right side of a screen. The electric charge in the pixel area 11a is outputted sequentially from a pixel in the right side to a pixel in the left side of the screen.

In this sense, the read-out order for the electric charge in the pixel areas 11a and 11b differs from each other. However, as shown in FIG. 2, when the screen is divided into two areas that are the pixel areas 11a and 11b, and the electric charge is read-out from the boundary of the pixel areas 11a and 11b, a number of the transferring stages in the horizontal direction at the boundary of the pixel areas 11a and 11b becomes the same.

Consequently, the number of the horizontal transferring stages for electric charge in the pixel from the boundary of the screen of the first and second pixel areas 11a and 11b become the same. The electric charge transferred in each of the first pixel area 11a and the second pixel area 11b is shifted in the same condition, so that the discontinuity of the image caused by the difference of the transferring stage for electric charge at the boundary of the center of the screen can be prevented.

The signal outputted from the amplifiers 15a and 15b are supplied to the CDS/AGCs 2a and 2b respectively for eliminating noise component and adjusting the level. Then the signals are provided to the A/D converter 3a and 3b and converted from analog to digital form and supplied to the comparison circuit 4.

The comparison circuit 4 adjusts the level of the signal to make the level of the reference signal to become the same by comparing the signals outputted from the A/D converters 3a and 3b respectively. More specifically, the reference signal for predetermined channel is fixed and the signal level of the other channel is adjusted to make its signal level to become the same level with the predetermined channel. However, the adjustment is not limited to the above. The level of the reference signal in both channels can be adjusted simultaneously to become the same level.

After the level of the signal for each channel is adjusted by the comparison circuit 4, the signal is provided to the line converter 5 to reverse the image in line direction of the CCD signal outputted from the first pixel area 11a. The combined signal as shown in FIG. 4(c) is provided to the YC processor 6 where the gamma processing and aperture control processing is conducted.

Each characteristic of the amplifiers 15a and 15b, the CDS/AGCs 2a and 2b, and the A/D converters 3a and 3b varies by individual difference of characteristic. As described above, the electric charge of the same level is inputted to the electric charge injectors 14a and 14b and is compared in the comparison circuit 4 so that the individual difference of characteristic is absorbed.

Assuming that each gain of the CDS/AGCs 2a and 2b can be set within a range from 0 dB to 30 dB and each dynamic range of the A/D converters 3a and 3b is 1V, the input level of the electric charge for the electric charge injectors 14a and 14b should be smaller than one thirty-seconds the reference signal that is equal to 31.25 mV outputted from the amplifiers 15a and 15b. Otherwise, the level adjustment in the comparison circuit 4 can not be conducted effectively.

For example, if both of the input channels of the A/D converter surpass 1 V, the output of each A/D converter becomes 1 V irrespective of characteristic differences of each channel. In this sense, the level adjustment of each channel can not be conducted by the signal of 1 V.

On the other hand, if the input level of the electric charge injectors 14a and 14b are set to less than or equal to 31.25 mV, the difference of each channel characteristic can be adjusted. However, the input level is so small that it can be affected by noise component. Consequently, the channel signal may not be adjusted properly.

Accordingly, as long as the reference signal for CCD signal outputted from the solid-state image sensing device is concerned, the gain of the CDS/AGCs 2a and 2b should be fixed to relatively low scale and fixed ratio such as 0 dB or 3 dB. The gain for the signal portion other than the reference signal, for example, is set for every VD period so that the individual difference can be adjusted precisely accurate.

Figure 5:
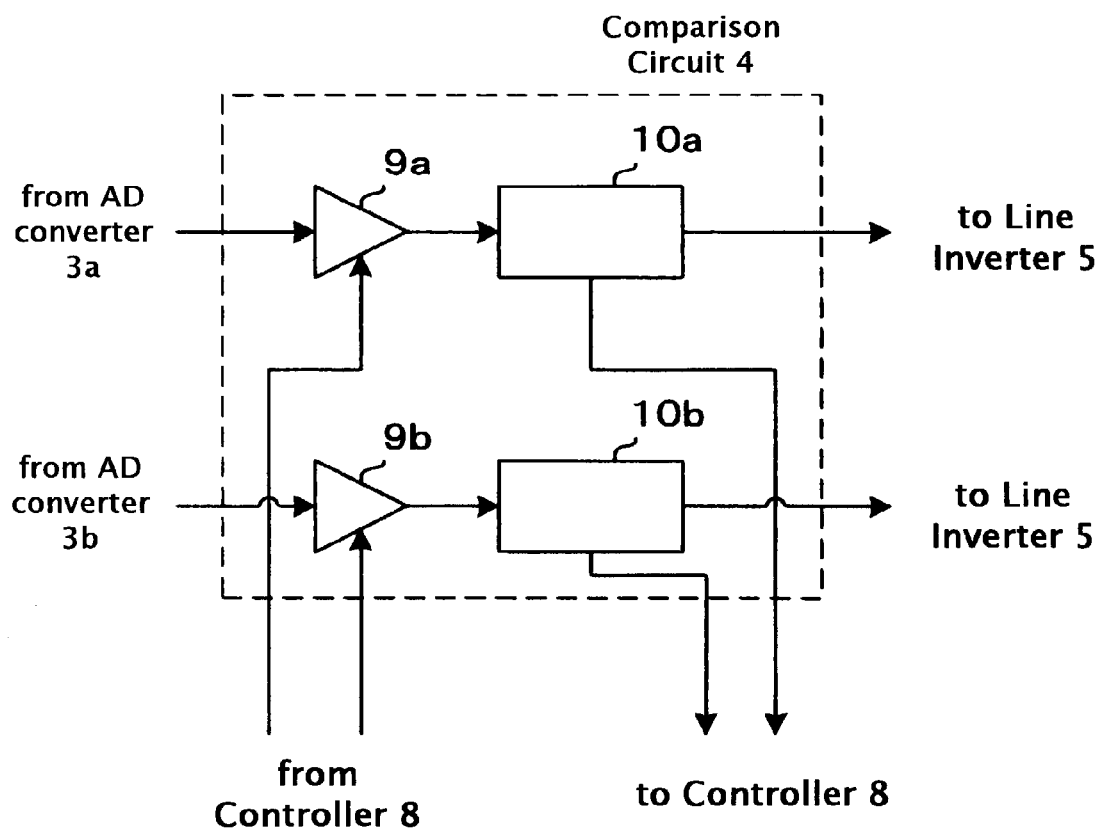
FIG. 5 is a block diagram of a comparison circuit in accordance with the present invention.
Figure 6:
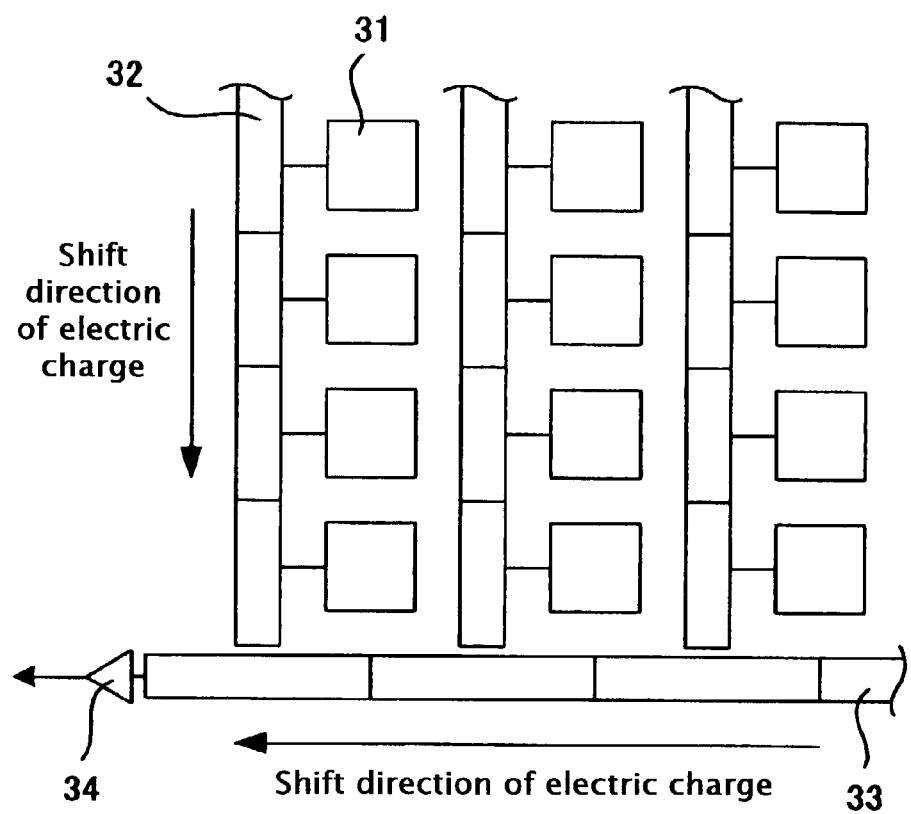
FIG. 6 is a plan view of a solid-state image sensing device of the related art.
Figure 7:
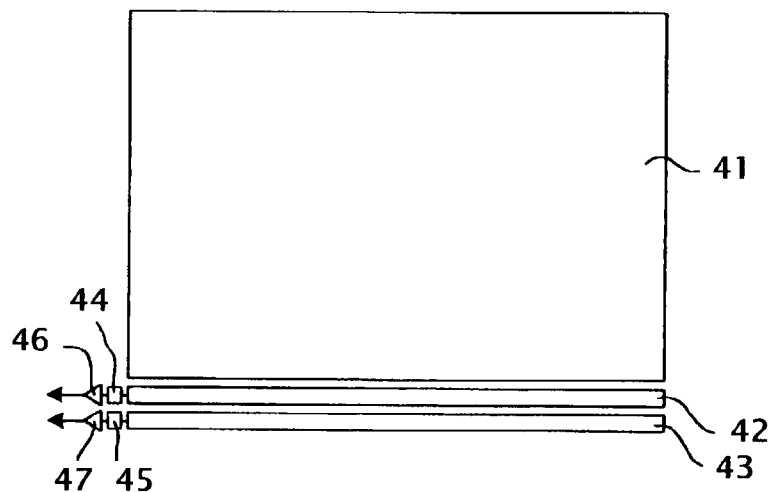
FIG. 7 is a diagram for an example of conventional solid-state image sensing device of which clock frequency for transferring electric charge of HCCD is decreased in accordance with the related art.

FIG. 5 is a block diagram of a comparison circuit in accordance with the present invention. The comparison circuit 4 is composed of amplifiers 9a and 9b which amplify a CCD signal outputted from the A/D converters 3a and 3b respectively, and sample hold (S/H) sections 10a and 10b which hold and output the value of the CCD signal amplified by the amplifiers 9a and 9b respectively.

The S/H sections 10a and 10b hold the sample value of the reference signal inputted just before and provide it to the controller 8. The controller 8 controls the gain of the amplifiers 9a and 9b so that the sample values outputted from the S/H sections 10a and 10b become the same.

As described above, both amplifiers 9a and 9b are necessary for changing the level of both channels of a CCD signal. However, for example, if the level of output signal from the A/D converter 3a is fixed and the level of output signal from the A/D converter 3b is variable, the amplifier 9a is not necessarily incorporated.

As described above, the present invention provides an image sensing device for having an output stage contiguous to the boundary of two CCD areas as shown in FIG. 2. However, the number of CCD areas is not limited to 2. It can also be 3 or more.

As for the image sensing device having three CCD areas, adjacent two CCD areas in the three are constructed as shown in FIG. 2. As for the image sensing device having four CCD areas, two groups of CCD areas shown in FIG. 2 can be provided.

As described above, the image sensing device in accordance with the present invention provides the first and second pixel areas in the CCD. Each output stage of the first and second HCCDs is opposed to each other, so that the clock frequency of transferring charge for the HCCD can be suppressed to low frequency. Further, the reference signal can be inserted to the CCD signal outputted from each HCCD, so that the level of the CCD signal outputted from each HCCD can be adjusted easily.

In addition, the gain of the CCD signal is fixed for the reference signal portion and variable for the other portion when amplifying the CCSD signal outputted from each HCCD, so that the level of the reference signal to be inputted can be set relatively high to adjust the signal level between the channels precisely accurate.

The present invention is not limited to the use of CCD for NTSC television system as is in the case of the embodiment described above, but also for other television system such as PAL or SECAM, analog or digital system using CCD device.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

What is claimed is:

1. An image sensing device for transferring electric charge to convert a light image into an electric signal by a plurality of photoelectric converters disposed in a CCD, the image sensing device comprising:

a plurality of pixel areas divided in the CCD for transferring an electric charge from the photoelectric converters;

a plurality of vertical transfer CCDs for transferring the electric charge from the plurality of photoelectric converters in a vertical direction;

a plurality of oblique shift CCDs for transferring the electric charge from the vertical transfer CCD to shift the electric charge in an oblique direction;

first and a second horizontal transfer CCDs for transferring the electric charge respectively, the electric charge being transferred from the oblique shift CCD in the horizontal direction to output an electric signal; and first and a second output stages for outputting the electric signal respectively, the electric signal being transferred from the first and the second horizontal transfer CCD in each divided pixel area, the first and the second output stage being at least disposed respectively contiguous to the boundary of the pixel areas adjacent one another in the CCD, first and a second electric charge injectors for supplying respectively a reference signal of a predetermined level to the output of the first or second horizontal transfer CCD, the first and second electric charge injectors being arranged respectively between the first output stage and the second output stage.

2. The image sensing device as claimed in claim 1 further comprising:

an amplifier for amplifying the electric signal added with the reference signal supplied from the electric charge injector;

a level adjust means for adjusting the signal level of the reference signal supplied from each divided pixel area equally; and an adder for adding the output of the level adjust means to produce a signal for one scanning line.

3. The image sensing device as claimed in claim 2, wherein the amplifier adjusts a gain of the reference signal by a fixed amount and adjusts a gain of a signal portion other than the reference signal by a variable amount in accordance with the signal level.

* * * * *